April 3, 1934.  G. JOHNSTON  1,953,080
MOUNTING FOR MACHINE GUNS AND THE LIKE
Filed Dec. 10, 1931  10 Sheets-Sheet 1
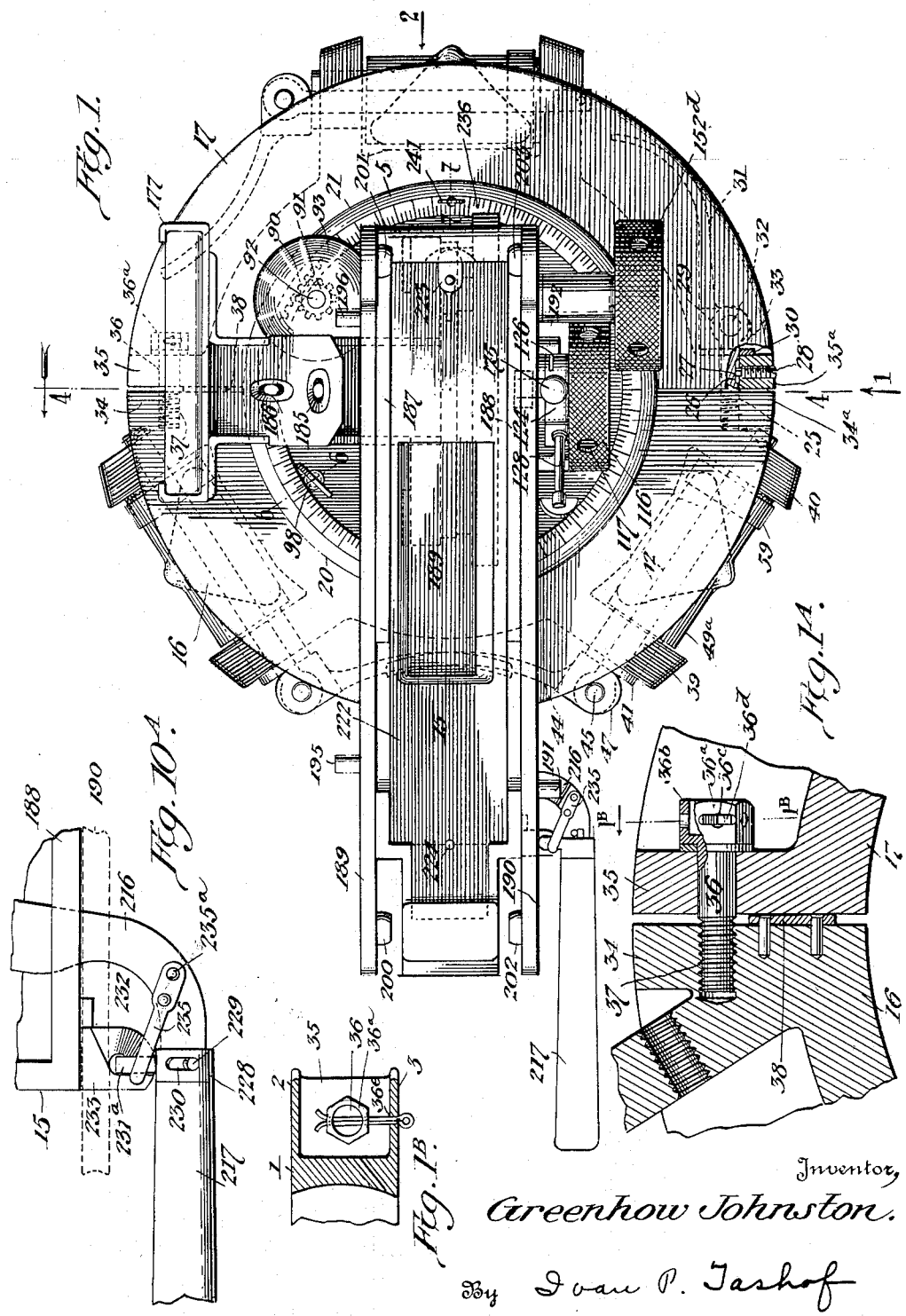
Inventor,
Greenhow Johnston.
By Ivan P. Tashof
Attorney

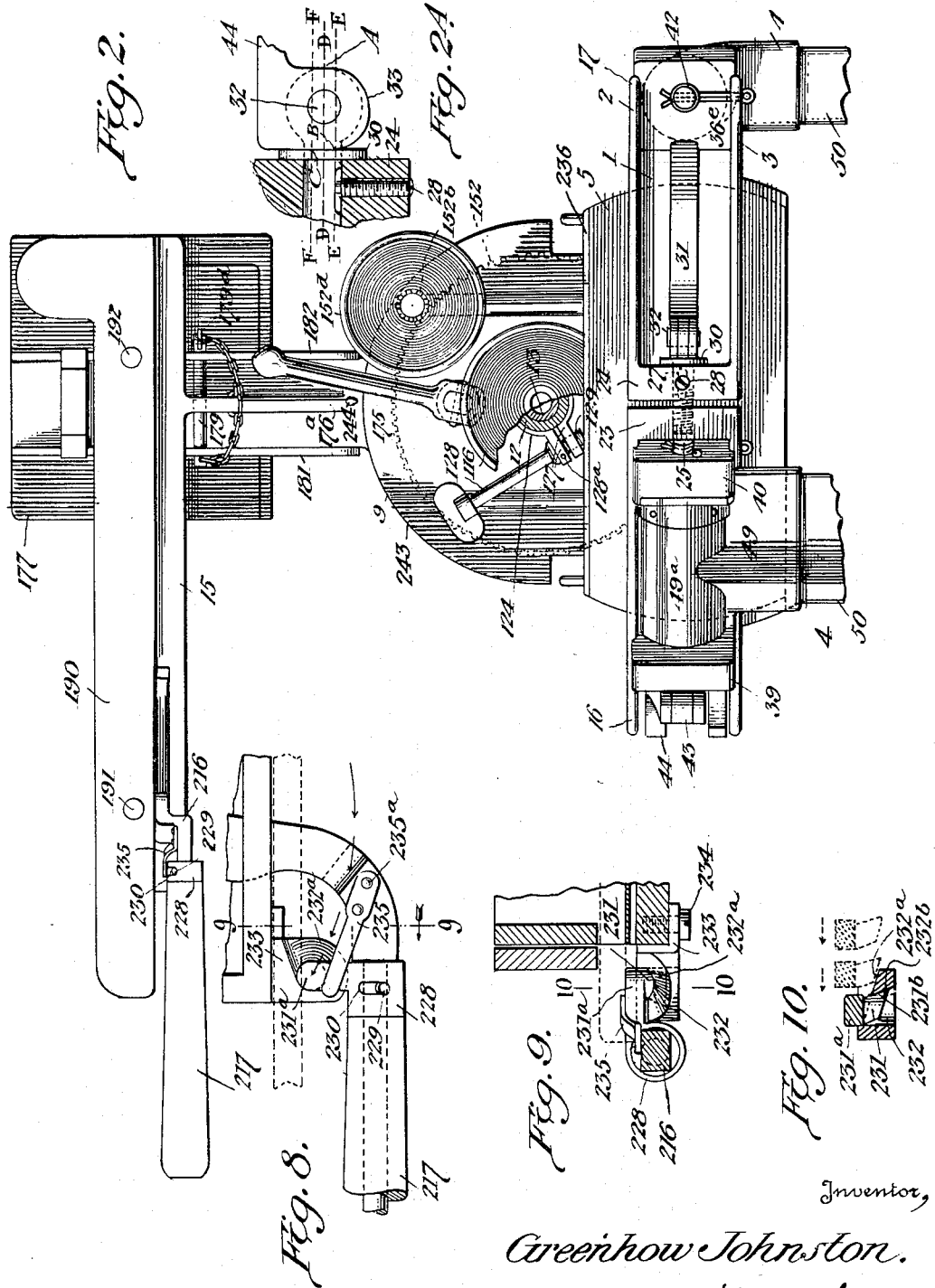

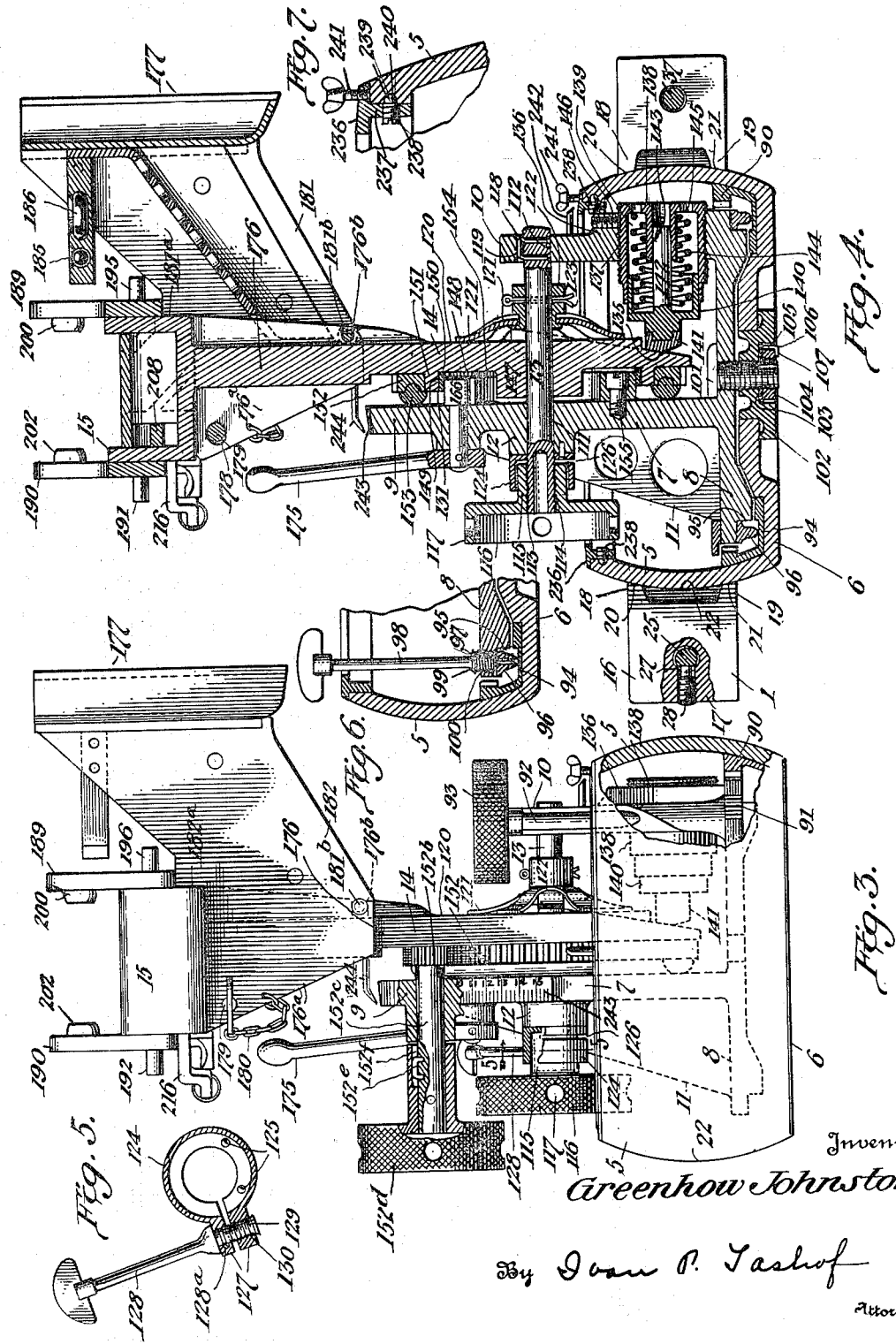

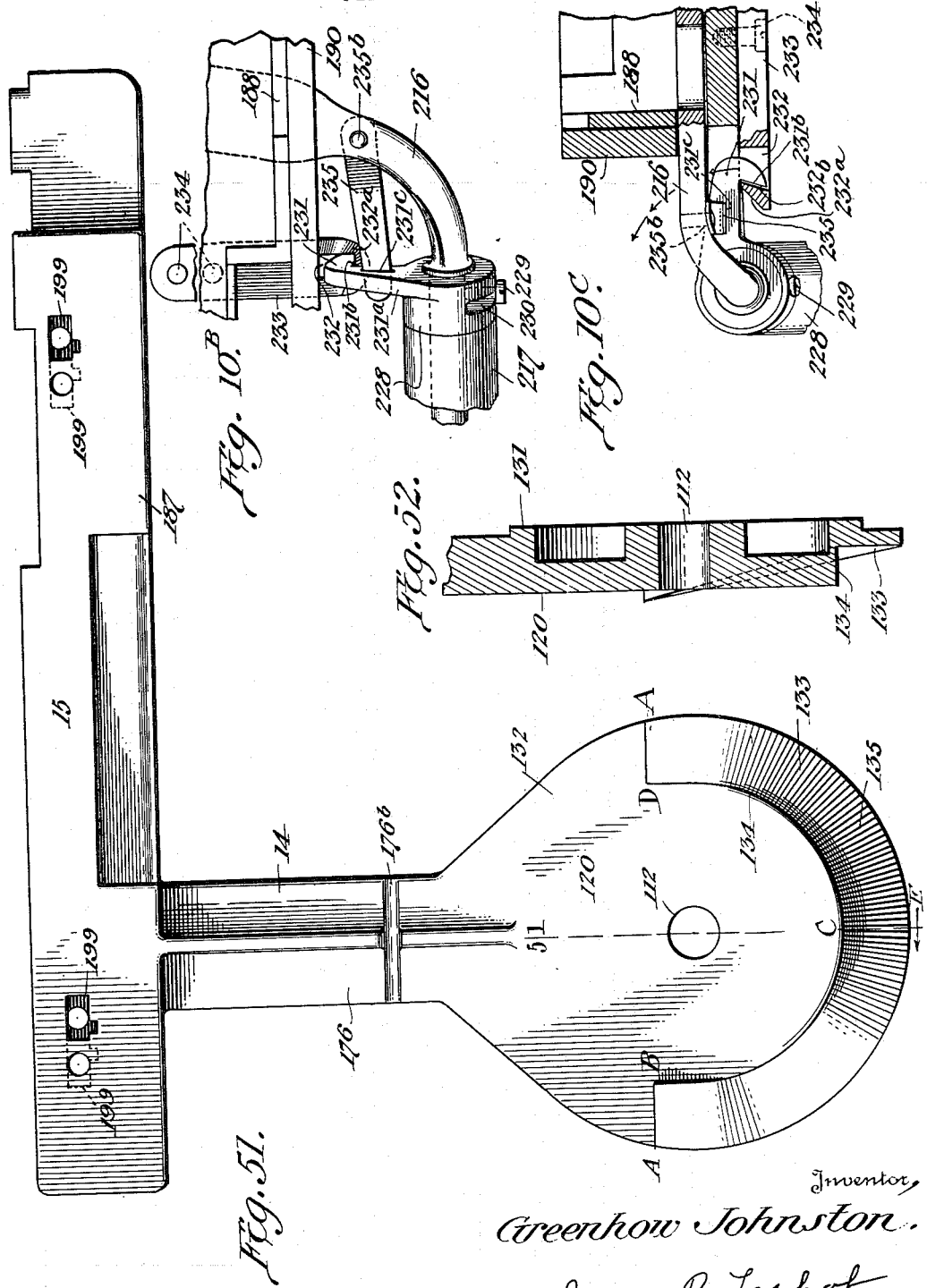

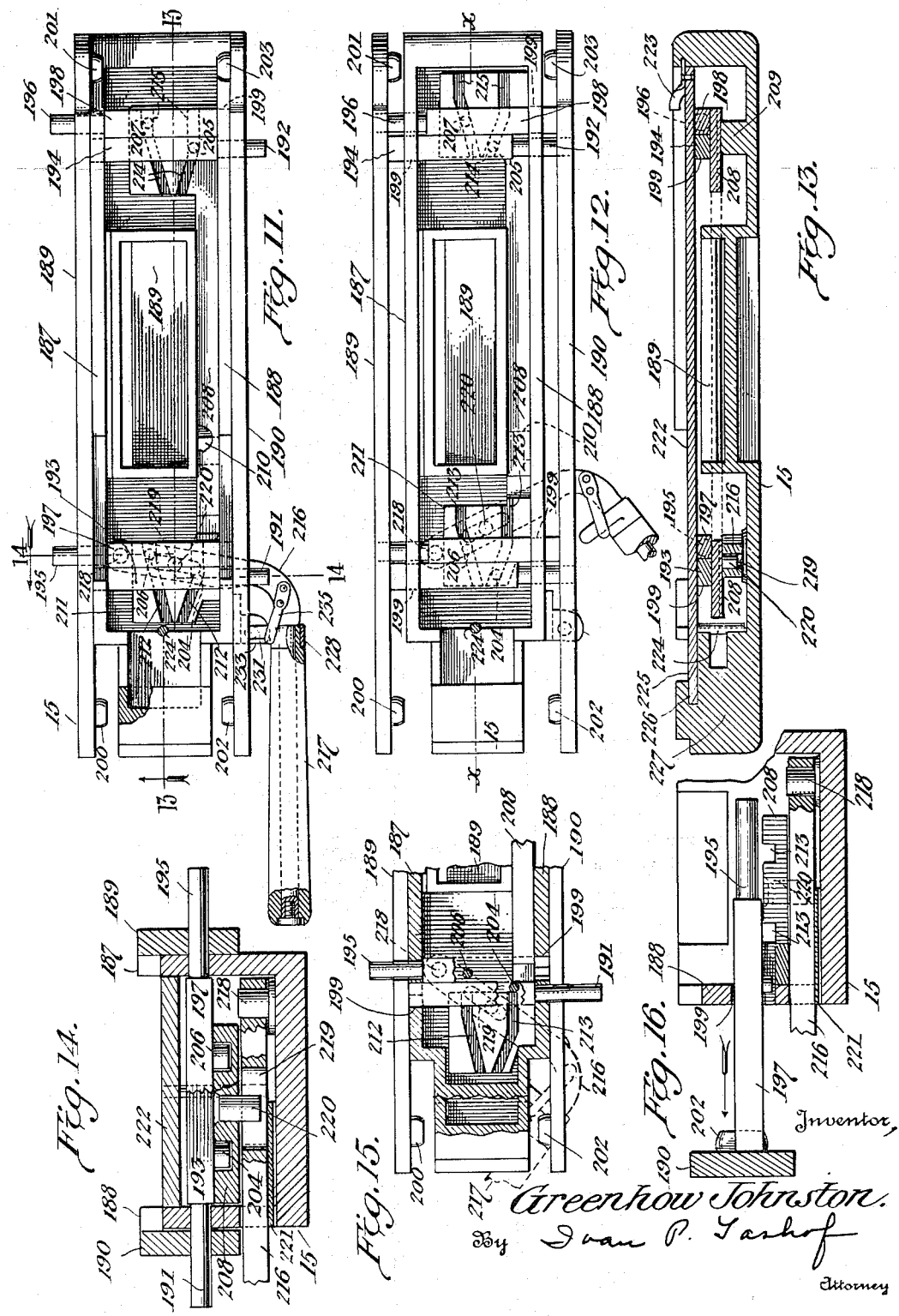

April 3, 1934.　　　G. JOHNSTON　　　1,953,080
MOUNTING FOR MACHINE GUNS AND THE LIKE
Filed Dec. 10, 1931　　10 Sheets-Sheet 6
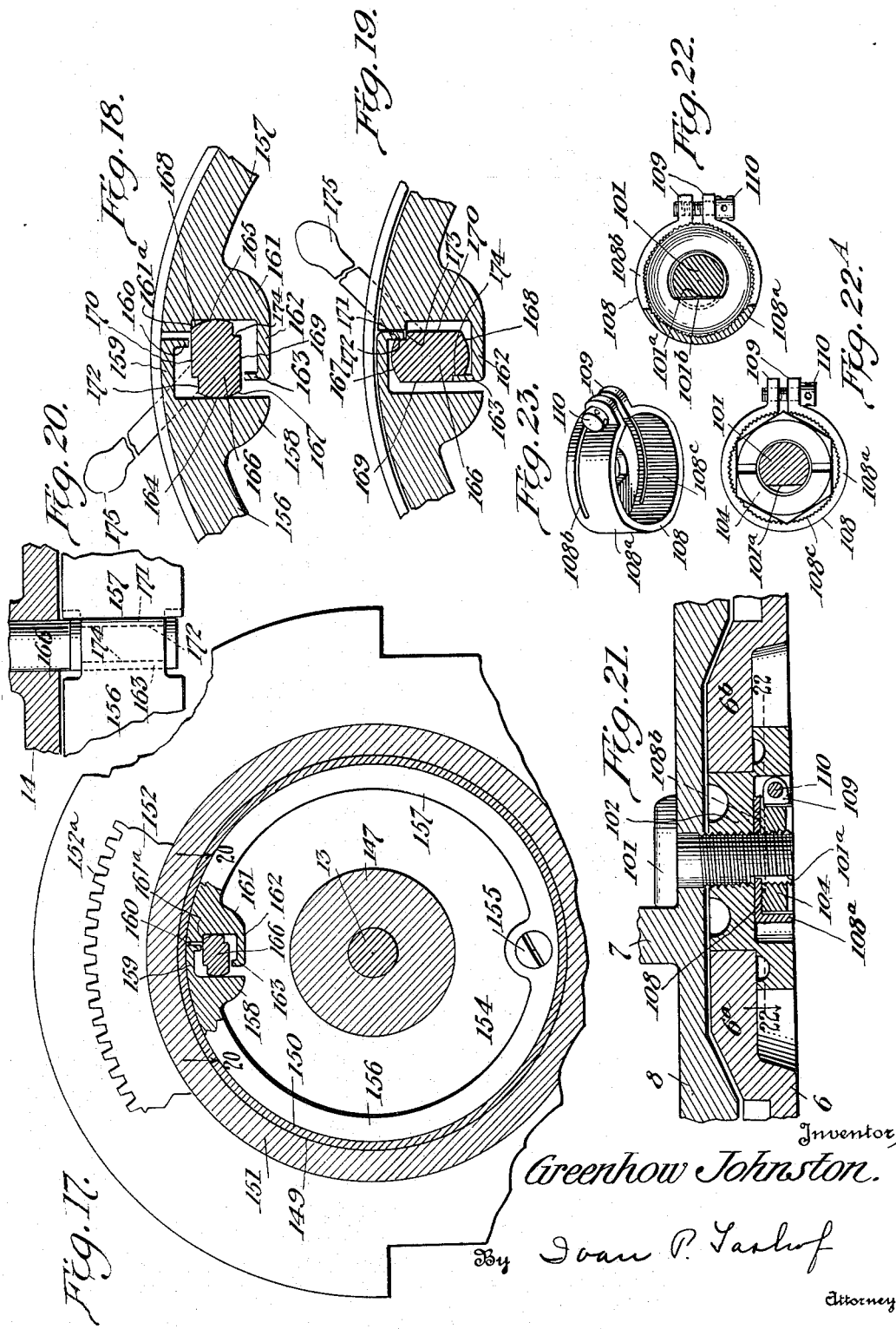

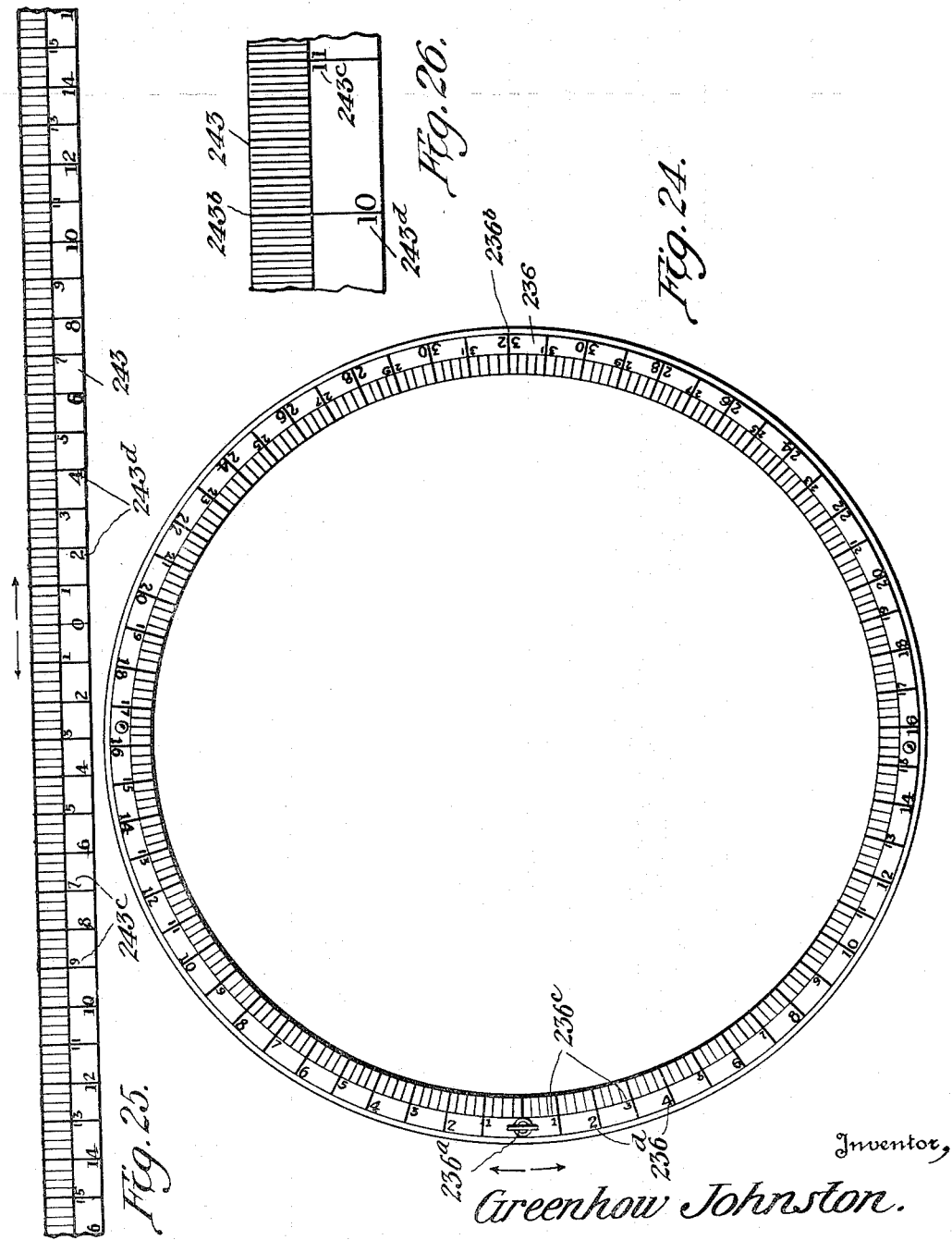

April 3, 1934. G. JOHNSTON 1,953,080
MOUNTING FOR MACHINE GUNS AND THE LIKE
Filed Dec. 10, 1931 10 Sheets-Sheet 8
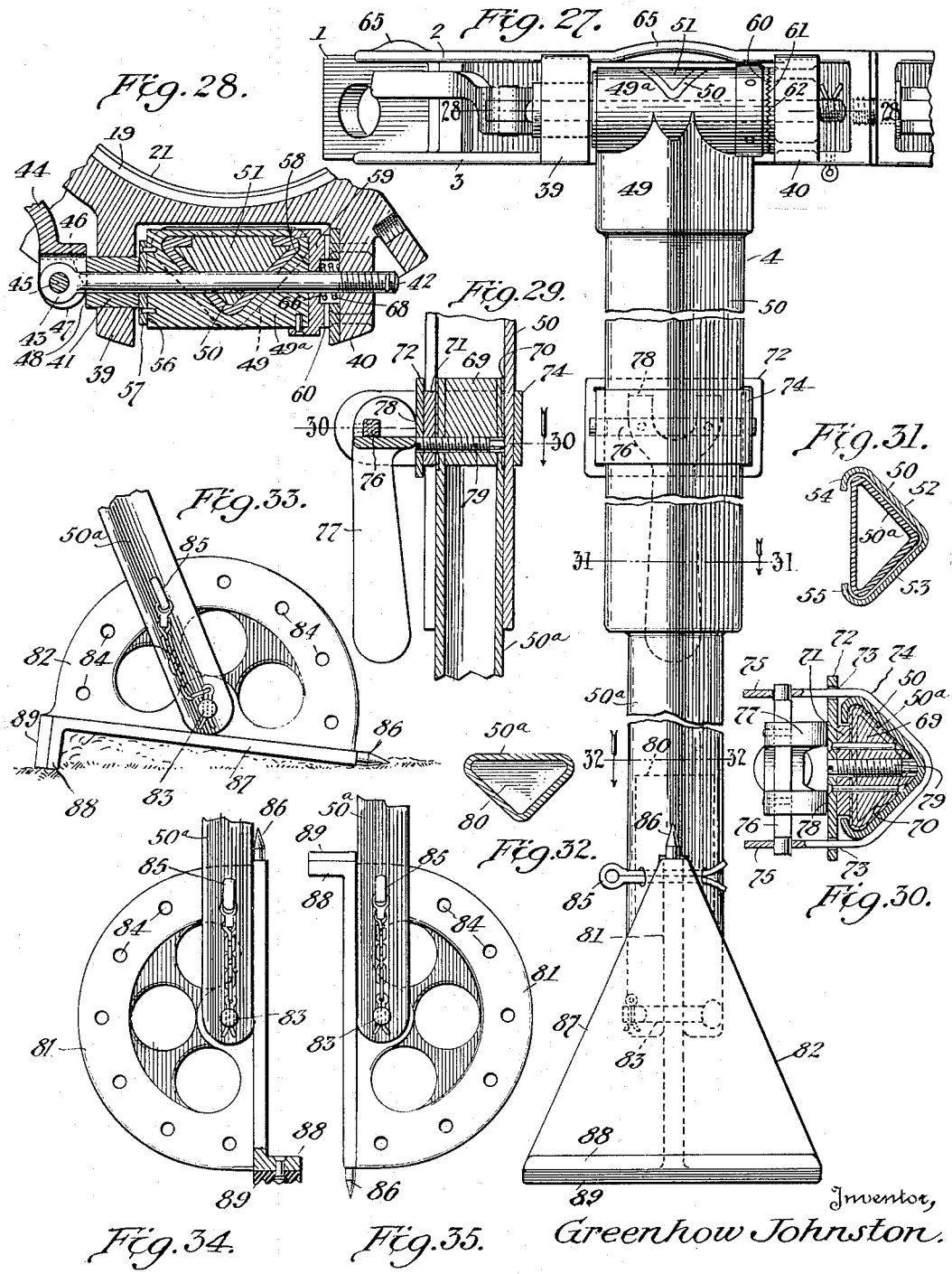
Inventor,
Greenhow Johnston
By Ioan P. Tashof
Attorney

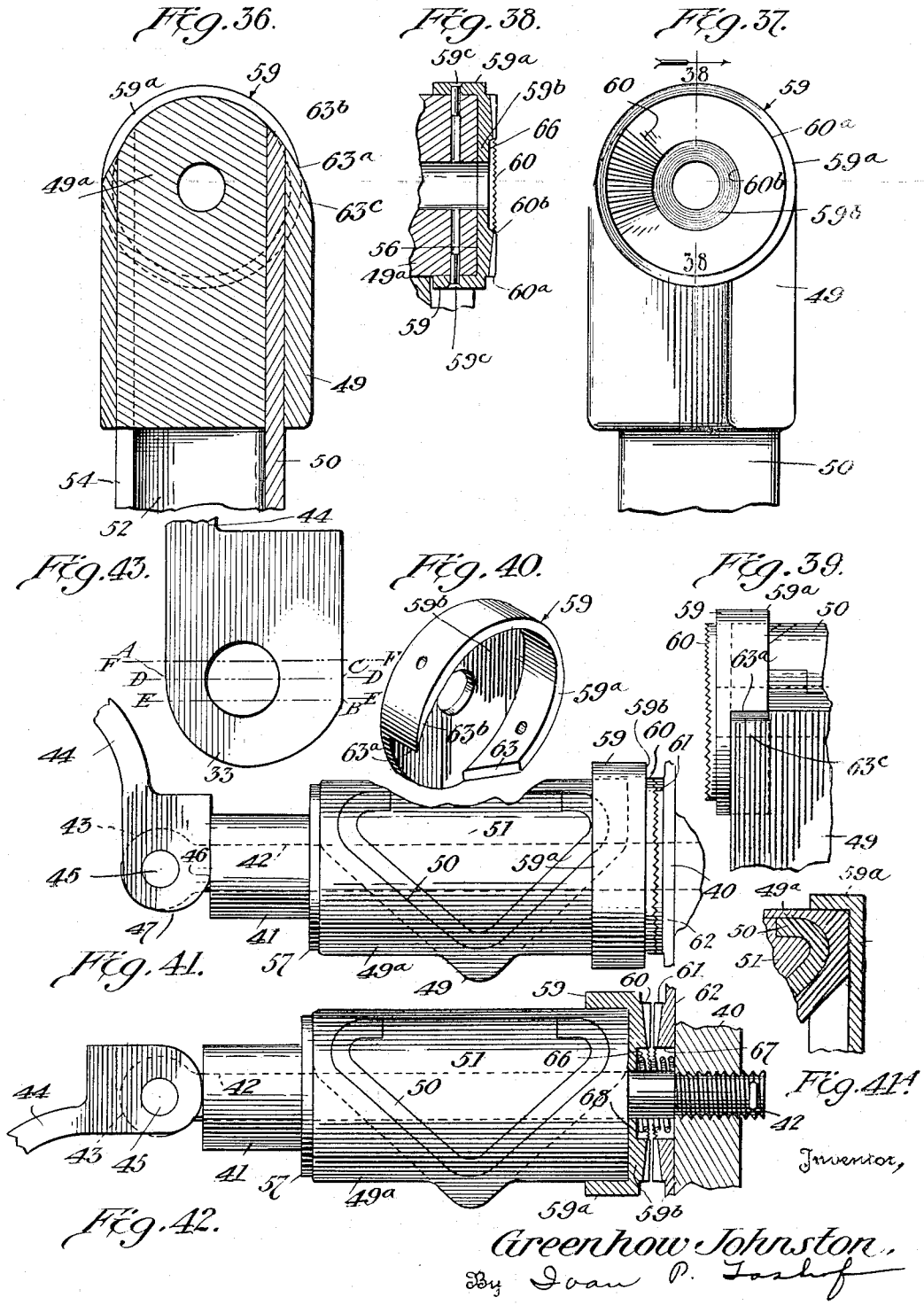

April 3, 1934. G. JOHNSTON 1,953,080
MOUNTING FOR MACHINE GUNS AND THE LIKE
Filed Dec. 10, 1931 10 Sheets-Sheet 10
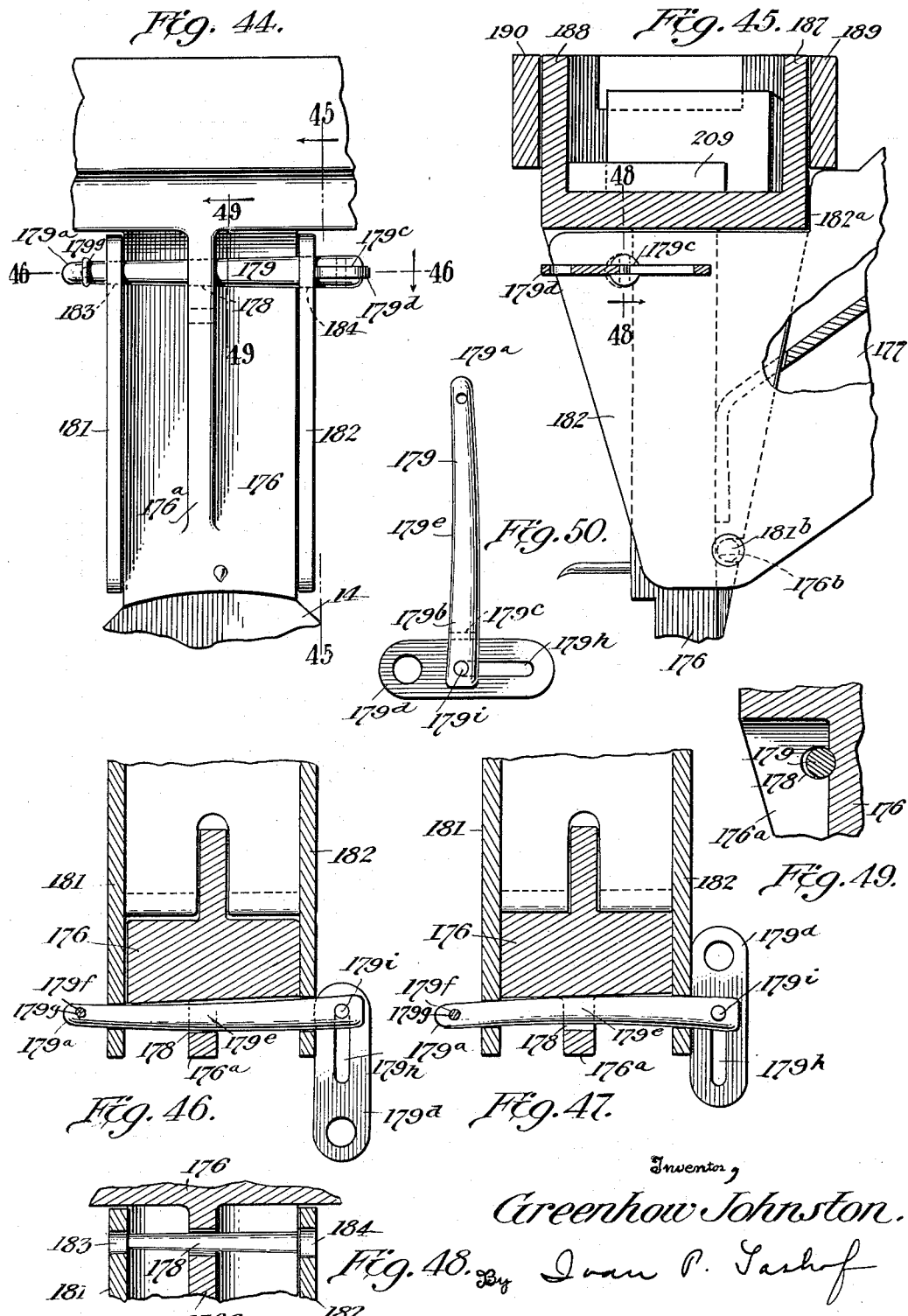

Patented Apr. 3, 1934

1,953,080

UNITED STATES PATENT OFFICE 1,953,080

MOUNTING FOR MACHINE GUNS AND THE LIKE

Greenhow Johnston, Glen Allen, Va., assignor of one-half to Greenhow Maury, Jr., Richmond, Va.

Application December 10, 1931, Serial No. 580,145

24 Claims. (Cl. 89—40)

The present invention in general relates to improvements in tripods, and more particularly to a tripod which is adapted for use in supporting small arms such as, for example, machine guns. While the present invention is advantageously used for the support of machine guns and the like, it is desired to point out that it is capable of general application, including its use in connection with cameras such as moving picture cameras.

Machine guns may be used for anti-aircraft work or for ground firing and in each case the tripod used to support the machine gun must have certain characteristics. Hitherto, it has not been possible to utilize one tripod interchangeably for both classes of firing. In anti-aircraft firing, the tripod must be capable of adjustment at will so that it can swing in a vertical arc up to 90°, and at the same time successfully take up the vibration induced by the firing of the gun. The latter necessitates the employment of rigid tripod legs of suitable height for anti-aircraft work. A tripod having the above characteristics, while suitable for anti-aircraft work could not be employed for ground firing since the rigid legs were incapable of adjustment to bring the machine gun sufficiently low on the ground. As a result, separate tripods of different heights were used.

In accordance with the present invention, there is provided a tripod and tripod legs which may be used for ground work or for anti-aircraft work, thereby giving what may be termed a duplex tripod.

The present invention comprises the combination of arcuate members forming a locking ring, a ball member mounted therein, a leg pivotally mounted in said arcuate members, means for locking the latter together and on the ball member, and means for positively maintaining the leg member locked in said arcuate members against the locking action induced by high vibratory impact such as occurs when a machine gun is automatically and continuously fired. The means for maintaining the leg member positively locked in the arcuate members includes a cam member eccentrically mounted adjacent the leg support and provided with a composite curved and straight line face. The leg member is pivotally mounted on a shaft which carries a movable pressure bearing and the cam member is eccentrically mounted on the shaft and abuts the exterior face of the pressure member when the cam member is in its locked position, thereby enabling the leg to resist the unlocking action, including the horizontal motion component induced by the high vibratory impact. Separate means are provided for enabling the leg to resist the rotative movement induced by the high vibratory impact tending to vibrate the leg, said means including cooperating meshing members fixed respectively on the leg, head, and on the leg support. Means are also provided for effecting a quick release of the leg member on unlocking.

More specifically, the present invention includes the combination of arcuate locking members having upper and lower strengthening flanges, a ball member mounted in said arcuate members, means for locking the arcuate members together on the ball member, and a leg member pivotally mounted between said flanges. The leg member has a plurality of sides, and a cuff having a cuff head is rigidly fixed on the leg sides at the head end. The leg carries a spacing block in tight engagement with the sides thereof. The cuff and spacing block confer rigidity upon the leg member and resist the transition of vibratory forces to the leg and tripod mounting.

The metal leg has a tendency to vibrate under the forces induced by a high vibratory impact, and this tendency to vibrate is communicated to the tripod mounting. In order to minimize this tendency, the upper leg is provided with a loading element which may take the form of a spacing block, the loading element comprising an additional means for increasing the rigidity of the leg and tending to resist the vibratory forces to the leg and the tripod mounting. The loading element is preferably carried on the leg adjacent its upper end, and a shaft is mounted in the leg bearings and passes through the apertured leg and the loading element to pivotally mount the leg on the leg support.

Slidably working in the stationary leg is a non-extensible leg, and this also may be provided with a loading element. Means are provided for locking the legs together and for taking up the wear between the legs.

A locking collar is so fixed on the cuff hub as to cause the locking collar to bite and lock itself into the hub cuff when acting under a circular motion tending to disengage the collar from the cuff. The locking collar fixed on the cuff hub and the cooperating locking collar fixed on the leg support both carry teeth and are provided with recesses. Mounted in said recesses is a compression spring, this forming means for effecting a quick release of the leg member on unlocking.

The present invention also contemplates certain novel details of combination, construction and arrangement of parts of the improved apparatus whereby certain important advantages are obtained, as will be more fully described hereinafter and pointed out in the claims, it being understood that the invention is susceptible of various changes in construction which may be made within the scope of the claims without departing from the spirit of the invention.

The present invention will be disclosed and fully explained by reference to the accompanying drawings in which:

Figure 1 is a plan view of the tripod mounting;

Fig. 1A is a horizontal sectional view showing the means for locking together the locking ring;

Fig. 1B is a section on the line 1B—1B of Fig. 1A;

Fig. 2 is a side elevation of the tripod mounting looking in the direction of the arrow 1 of Fig. 1;

Fig. 2A is a detail showing the cam shaped locking member in its locked position;

Fig. 3 is an end elevation looking in the direction of the arrow 2 of Fig. 1;

Fig. 4 is a vertical cross sectional view on the line 4—4 of Fig. 1;

Fig. 5 is a vertical section in the direction of the arrow on line 5—5 of Fig. 3, showing means for adjusting the tension on the horizontal axle upon which the carrying standard is mounted;

Fig. 6 is a vertical section taken on line 6—6 of Fig. 1, showing means for locking or braking the base of the upper tripod carrying head to the ball member or lower carrying head;

Fig. 7 is a vertical section on line 7—7 of Fig. 1, showing means for locking the vernier travel ring to the lower tripod carrying head or the ball member;

Fig. 8 is an enlarged plan view of locking means for positively retaining the clamping side lever in its locked position when the gun is mounted between the clamping members;

Fig. 9 is a transverse vertical section taken on lines 9—9 of Fig. 8 in the direction of the arrow;

Fig. 10 is a transverse vertical section taken on the line 10—10 of Fig. 9;

Fig. 10A is a plan view of a modified form of locking means for the clamping side lever;

Fig. 10B is a plan view of a further modified form of locking means for the clamping side lever;

Fig. 10C is a side view thereof;

Fig. 11 is a plan view of the instrument locking device, the top plate being removed to disclose the relation of the longitudinally movable sliding locking plate and the transversely movable clamping members, all the parts being shown in the locked position;

Fig. 12 is a plan view similar to Fig. 11, showing the parts in the unlocked position;

Fig. 13 is a longitudinal cross section taken on the line 13—13 of Fig. 11;

Fig. 14 is a transverse cross section taken on the line 14—14 of Fig. 11;

Fig. 15 is a plan view partly in section with the cover plate of the locking and clamping member removed, and showing the locking handle in its disengaging position for the purpose of allowing the removal of the side clamping plates;

Fig. 16 is a transverse section taken on the line 14—14 of Fig. 11, showing the side clamping members in disengaged position and free to slide out of the holding block;

Fig. 17 is an elevation partially in section of the brake shoe mechanism functioning as an auxiliary braking element to insure rigidity of the instrument carrying head;

Fig. 18 is an enlarged detail view, showing the brake shoe mechanism in its locked position;

Fig. 19 is a similar view, showing the brake shoe mechanism in the released or unlocked position;

Fig. 20 is a section on line 20—20 of Fig. 17;

Fig. 21 is a vertical sectional view showing a modified form of locking nut arrangement whereby the upper tripod carrying head is locked to the ball member;

Fig. 22 is a horizontal sectional view taken on line 22—22 of Fig. 21;

Fig. 22A is a plan view showing the serrated thimble brake;

Fig. 23 is a perspective view of the split cup thimble brake or ring;

Fig. 24 is a plan view of the micrometer travel ring mounted on the upper face of the ball member;

Fig. 25 is a plan view showing the elevational scale laid off in mils.

Fig. 26 is a detail showing a further refinement of the scale shown in Fig. 25;

Fig. 27 is an elevation showing the extensible tripod leg mounted on the tripod supporting base or locking ring;

Fig. 28 is a horizontal sectional view on line 28—28 of Fig. 27;

Fig. 29 is a longitudinal cross sectional view showing locking or clamping means for clamping the leg sections together;

Fig. 30 is a horizontal cross section on the line 30—30 of Fig. 29;

Fig. 31 is a horizontal sectional view on the line 31—31 of Fig. 27;

Fig. 32 is a horizontal cross section taken on line 32—32 of Fig. 27, showing the hollow triangular extensible tripod leg with its loading and strengthening plug;

Fig. 33 is a side elevation of a mud shoe;

Fig. 34 is a side elevation of the shoe in a different position, showing the applicability of the shoe to a surface which may be scratched, such as decks of ships or hardwood floors;

Fig. 35 is an elevational view of the shoe with the spike member positioned for mounting on a dirt bottom or the like;

Fig. 36 is a vertical section of the upper leg head;

Fig. 37 is a side elevation of the same;

Fig. 38 is a vertical section on line 38—38 of Fig. 37;

Fig. 39 is a rear elevation of the leg head showing the locking cuff or collar locked thereon;

Fig. 40 is a perspective view of the locking collar;

Fig. 41 is a plan view of the leg head and the locking mechanism therefor in the locked position;

Fig. 41A is a detail sectional view showing the mounting of the locking collar adjacent to the angular face of the leg cuff but whereby slippage is prevented;

Fig. 42 is a view similar to Fig. 41 showing the leg and locking mechanism in the unlocked position;

Fig. 43 is a detail of the locking head cam member;

Fig. 44 is a side elevation showing the ammunition carrier mounted on the upper instrument carrying head;

Fig. 45 is a sectional elevation taken on line 45—45 of Fig. 44;

Fig. 46 is a horizontal section taken on line 46—46 of Fig. 44 showing the locking cam pin in the position it assumes before it has been rotated to its locking position;

Fig. 47 is a similar view, the cam pin being shown in its locked position;

Fig. 48 is a sectional elevation on the line 48—48 of Fig. 45, the locking cam pin being removed;

Fig. 49 is a section on line 49—49 of Fig. 44, showing the eccentricity of the cam pin aperture;

Fig. 50 is a detail of the locking cam pin assembled with a floating link;

Fig. 51 is a side elevation of the upper instrument carrying head; and

Fig. 52 is a section on line 51—51 of Fig. 50.

The tripod, as shown in Figs. 1 to 4 inclusive comprises a tripod supporting base or locking ring 1 having upper and lower strengthening flanges 2 and 3, the lower flanges being cut away to receive legs 4. Mounted within the tripod supporting base or locking ring 1 is a lower tripod carrying head or ball member 5, having a bottom wall 6. Mounted on the bottom wall 6 for horizontal rotative movement is an upper tripod carrying head 7, provided with a standard supporting base 8, which has mounted thereon an instrument carrying head supporting standard 9, and a cooperating second standard 10, the former preferably having supporting ribs 11. These supporting ribs are merely illustrative of suitable supporting members, it being obvious that the supporting ribs may be positioned differently, be of a different construction, and in some cases totally eliminated. The standard 10 may also, when necessary, be provided with suitable supporting ribs. Projecting from the carrying head supporting standard 9 is a boss 12. Mounted in standards 9 and 10 is a floating axle 13, the latter carrying the instrument carrying head 14 having a projecting seat or cradle 15. It may be pointed out that the instrument carrying head, and consequently the instrument seat, has what may be termed a two-point suspension with a floating tension axle, thereby enabling the tripod mechanism to successfully assist in taking up the instrument recoil when the instrument is not in a locked position.

The tripod supporting base or locking ring 1 in the preferred construction is split into arcuate members 16 and 17, each thereof having upper and lower transversely projecting ribs 18 and 19 respectively, provided with surfaces 20 and 21 respectively, arcuate in shape, and adapted for engagement with the outer face 22 of the lower tripod carrying head or ball member 5. The projecting ribs 18 and 19, arcuate in shape, function to keep the ball member 5 rigid after the locking ring has been locked. This is due to the arcuate shape of the faces of the ribs 18 and 19 exerting a tightening effect on the outer face 22 of the ball member 5, this tightening effect being exerted above and below the center line of the arcuate members 16 and 17 in any position which the ball 5 may assume, it being of course obvious that the latter is used for leveling purposes.

It is to be noted that the arcuate members 16 and 17 are interiorly cut away to provide rib members 18 and 19 respectively, the arcuate surfaces of which function as continuous bearing surfaces with reference to the ball member 5. The arcuate members 16 and 17 and the ball member are preferably made of an aluminum alloy manufactured by the Aluminum Company of America, and designated by said company as "No. 43". While this material is the preferred one, it is desired to state that any suitable metal or alloy may be used. An aluminum alloy is preferred because it combines adequate strength with lightness. Instead of using aluminum alloys, bronze, brass, steel, cast iron, and the like may be used. The cutting away of the interior face of the arcuate members is believed to be of considerable importance in keeping the ball member rigid after the arcuate members have been locked thereon. Steel arcuate members having continuous non-ribbed interior arcuate faces engaging the exterior face of a steel ball member failed to hold the ball member rigid after the arcuate members had been tightened thereon, when this set up was subjected to a high impact.

It is only when the interior faces of the arcuate members are cut away to provide ribs that the ball member remains rigid under a high impact. It is recognized that it is impossible to provide exactly the same curvature on the exterior ball face and on the arcuate faces of the ribs, and it may well be that the tightening effect of the ribs is due to a wedging action induced by unequal curvatures of the contacting elements, and that this may be somewhat magnified when using a relatively soft material such as an aluminum alloy. Irrespective of theory, when the arcuate surfaces of the ball and of the ribs have substantially the same curvatures, the cut out arcuate members cooperate with the ball member to hold the latter rigid under a high impact.

The tripod supporting base or locking ring 1, which is composed of arcuate members 16 and 17 having upper flanges 2 and 3, is provided with ribs 23 and 24, as shown in Fig. 1 and Fig. 2. The ribs are apertured to receive a threaded bolt 25 for locking the ribs, and consequently the arcuate members of the locking ring together. The bolt 25 is cut away at 26 to provide a flat face 27 which cooperates with a set screw 28, functioning to keep the bolt 25 from turning. The set screw arrangement does not prevent the bolt 25 from working in the rib 24. The shank of the bolt is provided with threads cooperating with threads in the rib member 23 of the arcuate member 16. Adjacent the head 29 of the bolt 25 is a washer 30 forming a bearing surface so that the tightening lever 31 does not dig into the metal of the rib 24. The head 29 of the bolt is apertured to receive a pin 32. Eccentrically mounted on the head by means of the pin 32 is a cam shaped locking member 33 provided with a handle 31. It is to be noted that the cam shaped locking member 33 shown in detail in Fig. 2A in its locked position has a curved surface from the points A to B, and from the points B to C, the surface of the locking member is straight, thereby forming what may be termed a composite straight line and curved cam face. The line D—D passes through the center of the pin 32. The line E—E passes through the point B and indicates that portion of the straight cam face below the center line D—D. The line F—F indicates that portion of the straight cam face above the line D—D. As shown in the drawings, the straight portion is continued. While this is in some cases desirable, it is not absolutely necessary and it is merely the preferred design. The circular face of the eccentrically mounted cam functions as a ball or compression member, and the straight portion as a locking member. This construction of the cam member 33 is an improvement over the old construction in which the cam had a continuous circular face. It is to be remembered that when a machine gun mount is automatically and continuously fired, there is a tremendous recoil. In using the old cam locking device, which had a continuous curved face, the recoil unloosened the lock. In the present device, by reason of the cam being eccentrically mounted on the pin 32 and having a composite surface including a straight portion as pointed out, an effective locking action is obtained to lock the respective arcuate portions of the ring member together.

The arcuate members 16 and 17 are also provided with abutting ribs 34 and 35, as shown in Figs. 1 and 1A, and abutting ribs 34a and 35a, as shown in Fig. 1. Passing through apertures in the ribs 34 and 35 is a bolt 36, having a threaded shank 37, which cooperates with a threaded aperture in rib 34. Positioned between the ribs 34 and 35 is a spacing block 38, preferably slightly tapered so that the thinnest portion of the block is adjacent the inside edges of the arcuate members 16 and 17 and ring member 1, and the thickest portion is adjacent the bolt member 36. The bolt member 36 is provided with a recessed head 36a having walls 36b, forming a plurality of exterior flat faces having apertures 36c for the reception of a cotter pin 36d, as shown in Figures 1A and 1B. The ring 1 has an aperture 36e in the lower flange 3 in vertical alinement with certain apertures 36c in the bolt head, said alined apertures 36e and 36c receiving the cotter pin 36d for the purpose of locking the bolt 36 against rotation. The tapered spacing block functions to spread the arcuate members 16 and 17 apart when they are untightened.

Projecting outwardly from the arcuate member 16, as shown in Fig. 28, are the ribs 39 and 40, which act as supports for the leg member 4. The lower flange 3 is cut away at intervals to receive the heads of the leg members 4. The rib 39 carries a pressure block 41 functioning as a bearing member. The rib 40 is apertured and receives an axle or shaft 42, the axle also passing through the moveable pressure block 41, as shown in Fig. 28. One end of the axle or shaft 42 is threaded to cooperate with the threaded aperture of rib 40. The axle 42 is provided with an eye head 43, which is eccentrically connected to the locking member 44 by means of a pin 45. The locking member 44 is of the same construction as that shown in Fig. 2A, and has been previously described. The eccentrically mounted locking member 44 is provided with a composite cam surface including a straight portion 46 and a curved portion 47. The straight portion 46 of the locking head abuts against the face 48 of the pressure bearing 41 when the locking head is in the locked position.

The leg member 4, this numeral being used to denote the leg member as an entirety, is pivotally mounted on the axle 42. The head of the leg member 4 includes the following elements: a hub 49a having a depending cuff 49, a stationary section of the leg 50, and a loading or spacing block 51. The leg member 50 is preferably made from a flat sheet of metal or alloy, preferably an aluminum alloy, and is cast, bent, or drawn into a triangular shape, as shown in Fig. 31, the stationary leg 50 being provided with sides 52 and 53 opposing one another to form the sides of a triangle. Each side 52 and 53 has turned in flanges 54 and 55, which function to strengthen the leg member.

In making the leg mounting, the leg 50 is inserted into the cuff 49. Thereafter, the spacing or loading block 51 which is triangularly shaped to correspond with the triangular shape of the leg 50, is inserted between the cuff 49 and the sides 52 and 53 and the flanges 54 and 55 of the leg member 50. Preferably, the spacing block 51 is inserted by hydraulic pressure, thereby forming a leg mounting which is rigid. The relationship of these various parts is clearly shown in Figs. 28 and 31, after the parts are assembled.

While the above is the preferred method of assembling the upper leg mounting, it is desired to point out the invention is not limited to this specific method, and that the upper leg 50, the cuff 49, hub 49a, and the spacing block 51 may be integrally formed by casting. The face 56 of the cuff hub 49a has fastened adjacent thereto a pressure wearing plate 57, the function of the pressure plate being to prevent wear taking place on the cuff hub 49a by the pressure bearing 41. Fastened adjacent the face 58 of the cuff hub 49c is a locking collar or cuff 59 which is made of a relatively hard material compared to the cuff hub 49a. The locking collar or cuff 59 is provided with teeth 60 which are preferably cut on a bevel of 1¾″, that is, the outer circumferential edge 60a of the teeth has a deeper cut than the inner circumferential edge 60b. The degree of bevel may, of course, be changed. These teeth cooperate with corresponding teeth 61 on a hard metal plate 62, which is fastened on the rib 40, as shown in Figs. 27, 39, 41 and 42. The collar 59 and the plate 62 are so mounted as to prevent wear taking place on the cuff hub 49a or on the inner face of the rib 40.

The arrangement above described forms auxiliary means enabling the leg to resist motion and especially the rotative motion induced by a high vibrating impact such as may be caused by continuous firing of a machine gun thereby producing a tendency to vibrate the leg.

The locking collar 59 is in the form of a disc having a peripheral flange 59a and a face 59b carrying on the outer surface thereof the teeth 60. The flange 59a is cut away at a portion thereof to facilitate a perfect fit with the varying angles of the cuff hub casting 49a, and is further so constructed to prevent any rotary slip on the cuff hub casting. This is accomplished by providing the flange 59a with a bearing face 63 cut away at the same angle as that of the face of the cuff hub 49a, as shown in Figs. 40, 41 and 41a. The flange 59a is also cut away at the point 63a to provide a tapered flange portion 63b to accommodate the rearward bulge of the hub cuff 49a at the point 63c, as shown in Figs 36 and 38. If there is any tendency for the collar 59 to slip, this is restricted by the tapered flange portions 63b biting into the metal of the hub cuff casting 49a and by the pins 59c by which the collar 59 is fixed on the hub cuff casting.

The upper flange 2 of the locking ring 1 is slightly cupped at the point 65 above the leg mounting so that when the tripod head is flat on the ground, the shoes of the leg may also be on the ground.

The collar 59 is countersunk at 66, as shown in detail in Figs. 28 and 42, and the plate 62 is also cut away at 67 to allow a spring 68 to be carried by the axle 42. The function of the spring 67 is to effect a quick release of the teeth 60 and 61 when the handle 44 is turned to release the leg member and allow it to be positioned as desired. This forms means for effecting a quick release of the leg member when it is unlocked.

It is to be noted that by means of the threaded shank of the axle 42, means are provided for taking care of wear between the various parts of the leg mounting. In other words, the axle 42 can be tightened or loosened as desired.

The inner extensible leg 50a is mounted in the non-extensible outer leg 50, and means are provided for locking the inner leg to the outer leg. The inner leg 50a is provided adjacent the top edges thereof with a short loading plug 69 which adds strength to the leg construction and resists the transmission of vibrating forces to the leg and tripod mounting. Surrounding the upper outer portion of the inner leg is a copper plate 70, the function of the copper plate being to prevent the outer leg from riding on the inner leg with undue wear, it being pointed out that in the preferred construction the inner legs and outer legs are made of a metal alloy, for example, an aluminum alloy. Riveted to the copper plate 70 and the plug 69 and the inner leg 50a is a spacing plate 71. Adjacent the spacing plate 71 is a guide plate 72, provided with slots 73 to receive a compression clamping member 74. The ear 75 of the compression member 74 is provided with apertures adapted to receive a shaft 76 having mounted thereon a cam-acting locking member 77. It is desired to point out that the cam 78 of the locking member 77 is eccentrically mounted on the shaft 76, the cam of the locking member being constructed in a manner identical with the locking member 44, as shown in Fig. 28, and which is provided with a composite cam face.

An adjustment screw 79 is mounted to pass through the guide plates 72, the spacing block 71, the copper ring 70, and the leg 50a, and is adapted when the inner and outer sections of the legs are tightened to abut against the apex of the stationary outer leg 50, as clearly shown in Figs. 29 and 30. The adjusting screw 70 furnishes means for taking up the wear between the inner and outer legs. The arrangement above described furnishes means for mounting the inner leg in the outer leg and locking the same together.

The lower portion of the inner leg 50a is provided with a plug member 80, which functions as a loading element, the latter and the sides of the inner leg being slotted to receive the circular flange 81 of the mud shoe 82. The leg 50a is slotted to receive a pin 83, the latter acting as a shaft for pivotally mounting the shoe 82. The circular flange 81 is provided with a series of holes 84, so that the shoe 82 may take any desired position. When the shoe is in a predetermined position, it may be locked to the legs by means of a cotter pin 85. The shoe 82 is provided with a spear point 86. The shoe is shown attached to the inner leg member 50a in Fig. 27, ready for use on a hardwood floor or the like. In order that the floors may not be scratched, the triangular shoe base 87 is provided with a flange 88 having secured thereto a soft material 89, for example, hard or soft rubber. As shown in Fig. 35, the shoe is positioned for use in hard dirt, and as shown in Fig. 33, it is positioned for use in soft material of any character, for example soft mud or sand. When the cotter pin 85 is released, the shoe member will adjust itself to the contour of the base upon which it is resting. When the shoe is in the position shown in Fig. 27, the inner leg 50a may be raised so that the leg 50 covers the spear point 86, there being sufficient clearance between the inner and outer legs for this purpose. In this manner, the spear point 86 is prevented from coming in contact with vegetation or any other material which might be damaged by the spear point.

Fixed within the bottom wall 6 of the ball member 5 is an internal gear ring 90, which cooperates with a pinion gear 91, as shown in Figs. 3 and 4, the pinion gear being mounted on a shaft 92 positioned on the carrying head supporting standard 10. The shaft is provided with a knurled head 93, thereby enabling the instrument carrying head 14 and the instrument supporting base 8 to be rotated within the ball member 5 by a slow movement. In other words, this arrangement is a secondary slow movement, functioning in addition when desired to the primary quick movement of the instrument carrying head 14 and the base 8 relative to the ball member 5.

Mounted on the bottom wall 6 of the ball member is a friction plate 94, preferably of bronze, functioning to provide frictional contact between the supporting base 8 and the bottom member 6 of the ball 5. Adjacent the shoulder 95 of the supporting base 8 is positioned a brake member 96 which receives the extension 97 of a braking pin 98. The latter is provided with threads 99 which cooperate with threads 100 in the supporting base 8, as shown in Fig. 6. The structure set forth insures a positive braking action between the bottom wall 6 of the ball member and the supporting base 8.

The bottom member 8 is apertured to receive a load bolt 101 which passes through a nut 102 adjacent to the raised portions 6a and 6b of the bottom wall 6 of the ball member 5, as shown in Fig. 4. Positioned on the bolt 101 is a washer 103 made out of any metal, but preferably of brass. A fastening nut 104 is threaded on the shank of the bolt 101, adjacent the washer 103. When the fastening nut 104 is tightened, the supporting base 8 is brought into tight engagement with the ball member 5, and so effects a tightening together of the two members.

It is to be noted that the washer 103 is provided with a projecting vertical tongue 105 bent at 106 to provide a projecting horizontal flange 107.

After the supporting base member 8 has been brought into tightened engagement with the bottom wall 6 of the ring 5, an additional tightening is effected by the bending over of the projecting tongue 105 to form the horizontal flange 107.

Instead of using the washer 103 having the projecting vertical flange 105 and the horizontal flange 107, a cup or thimble ring 108 may be substituted therefor, as shown in Figs. 21, 22, 22A and 23, the cup or thimble ring 108 having projecting flanges 109 locked together by means of a screw 110.

Fig. 22A shows the thimble brake 108 together with the locking nut 104. The thimble brake is provided with a side wall 108a, and is split at 108b to facilitate the action of the brake. The bolt 101 is cut away at 101a to prevent the thimble brake from turning.

When it is desired to tighten, the locking nut 104 is screwed on the shank of the bolt 101, the thimble ring 108 has been previously positioned on the bolt with squared portion of the bolt registering with the squared face 101b of thimble ring 108. The nut 104 is then screwed into place on the bolt 101 and after the proper tension has been acquired the nut is locked in place on the bolt 101 by tightening up on the screw 110 of the locking ring 108, thereby bringing the teeth 108c in locking contact with the nut 104.

Mounted on the carrying head supporting standard 9 by means of the axle 13 is the instrument carrying head 14. The axle 13 carrying the supporting head 14 is mounted in the standard 9 and the second cooperating standard 10. It is desired to point out that the axle 13 is a floating axle, thereby enabling the upper instrument parts to be adjusted with facility and speed, which is essential in an instrument of the character set forth.

The axle 13 passes through apertures 111 in the supporting standard 9 and the bosses 12, and 112, in the cooperating standard 10. The axle is externally threaded at 113 and cooperates with internal threads 114 of the hub shoulder 115, projecting from the knurled head 116, the latter being provided with apertures 117 for the insertion of any instrument adapted to turn and tighten the head. It is to be noted that the right hand portion of the axle 13 is provided with a staple key 118 which rides in a slot 119, thereby allowing the axle 13 to move from left to right, or right to left, while at the same time preventing the axle from turning when the tightening head 116 is turned to apply tension on the axle spring.

Mounted on the tension bearing 122 and bearing against an outer wall 120 of the instrument carrying head 14 is a tension spring 121, the latter being mounted so that it can rotate under tension. The tension bearing 122 is fixed on the axle 13 by means of a cotter pin 123.

When the axle head 116 is turned to bring the instrument carrying head 14 in tight engagement with the supporting standard 9, the supporting axle 13 is moved from right to left, and in doing so puts the tension spring 121 under tension, this being transmitted to the instrument carrying head 14 and the wedge-shaped portion thereof. When the instrument carrying head 14 is rotated under tension, the tension bearing 122 remains fixed, but the tension spring 121 is free to rotate. This functions to keep the fingers of the spring member 121 in alinement and to reduce to a minimum the wear on the instrument carrying head 14.

It is necessary to keep the head mechanism and the tension device described under suitable tension, and in order to assist in keeping these members under tension, an auxiliary cup or thimble brake is used. As shown in Figs. 4 and 5, the brake 124 is pinned to the boss 12 by dowel pins 125. The brake 124 is provided with a slit 126. The inner surface of the brake acts on the outer surface of the hub 115 of the head 116. The brake 124 carries flanges 127 which are apertured to receive a tightening pin 128, the shank of which carries threads 129, cooperating with the internal threads 130 of the lower brake flange 127. The upper portion of the shank of the pin 128 which rides in the upper apertured flange 127 has a smooth surface. The upper portion of the shank is provided with a dowel pin 128a which functions to assist in opening and closing the brake member.

The instrument carrying head 14 has an outer wall 120 and an inner wall 131. The surface of the outer wall 120 is cut away at its lower portion to provide what is herein termed an upper member 132 having an arcuate wall 134 separating the upper member 132 from the lower wedge-shaped member 135. The construction of this wedge-shaped member is set forth in Figures 51 and 52 respectively. The lowermost boundary line of the upper member 132 is defined by the compound line ABCDA', as shown in Figure 51. Above this line the horizontal cross sectional area of the upper member 132 is substantially constant. It is to be noted that the lowermost portion of the outer wall 120 has been cut away in a varying amount to form the lower wedge-shaped member, preferably cam-shaped, and having a vertically disposed face 133 adjacent to a bottom wall 134 preferably curved to simulate a cam surface. The outer wedge surface 133 of the wedge-shaped member 135 is defined by the lines ABCDA' and AEA', and the varying cross sectional area of the lower member, or its wedge-shape, is clearly shown by an inspection of Figures 4, 51 and 52 respectively.

The standard 10 and its projecting boss 136 are apertured at 137, the walls thereof being adapted to receive a rotatable externally threaded guide nut 138. The guide nut is recessed to provide a conduit 139, the recess 139 being adapted to receive a cam pin 140, provided with a fiber end 141, the cam pin being capable of being advanced by rotation of the guide nut 138. The cam pin 140 is provided with a projecting shoulder 142 which rides on the sleeve 143 of the guide nut 138. Mounted upon the sleeve 143 is a tension spring 144. The guide nut 138 is provided with apertures 145 for tightening the same, and transmitting the tension to the cam shaped wedge-face 135. A lock screw 146 is provided for locking the guide nut 138 after it is under proper tension. This assemblage of elements constitutes the lower variable pressure means.

When adjusting the instrument carrying head 14, it may be first positioned in place and assisted in being held there by the pressure of spring 144, the amount of the pressure being capable of variation by adjusting the guide nut 138. This pressure will of course vary, depending upon what use the tripod is put to, and for this reason it may be termed a variable pressure means. The above will be clear from the following. When the tripod is used for mounting a machine gun which fires under the pressure induced by explosion gases, and consequently is subjected to a recoil force, the spring 144 is set under a tension sufficient to hold the carrying head and instrument thereon in a fixed position before firing, and substantially keep it in that position after firing. In other words, the structure presented acts as a damper for the shock produced during firing when the cooperating elements have been previously set in a predetermined position. During the firing step, the firing may slightly move the carrying head, but the recoil force produced by the explosion gases and which is transmitted to the gun and the carrying head moves the latter substantially back to its original position, or acts as a damper for the vibrations. At least, measurements which have been made tend to substantiate the above. However, regardless of theory, the use of the cam wedge face 135 cooperating with a spring member 134 and the other elements, as set forth, gives superior results over that produced by any spring arrangement now in use.

It is desired to point out that the spring 144 automatically adjusts itself to the position the cam 135 assumes when the carrying head is put under a predetermined pressure sufficient to maintain the instrument, for example, a machine gun, in its initial position. The final tightening of the instrument carrying head 14 to the carrying standard 9 is taken care of by the tension spring 121, and its train of related elements, all as previously set forth. When the carrying head is used for mounting a moving picture camera, the wedge face 135 cooperates with the tension spring 144 and the carrying head with the camera may be turned on its pivot and frictionally held in any desired position. No gears are used to perform the functions set forth.

The inner face 131 of the carrying head 14 is cut away to provide a hub 147, and an angular recess 148 having an annular wall 149. A brake sleeve 150 abuts against the inner wall of an annular flange 151. Fixed adjacent the outer face of the flange 151 is a gear ring 152, cut out to receive a packing 153, as shown in Fig. 4.

Mounted on the standard carrying-head supporting standard 9 is an expanding brake shoe 154 cooperating with the brake sleeve 150, as shown in Figs. 17, 18 and 19. The brake shoe 154 is pivoted to the inner wall of the carrying head standard 9 by means of a screw 155. The brake is split at its top to form an expanding member having expanding shoe segments 156 and 157 respectively. The expanding segment 156 is provided with a shoulder 158 having extending therefrom a hooked member 159 provided with a hook 160. The expanding segment 157 also has a shoulder 161 having extending from its lower edge a hook member 162, provided with a hook 163. At the top of the shoulder 161 is an offset flange 161a.

Positioned adjacent the hook members 159 and 162, and between the inner faces 164 and 165 of the shoulders 158 and 161 respectively is an expanding dog 166, having an arcuate upper face 167, an arcuate lower face 168, and side faces 169 and 170. The upper face 167 and side face 170 is cut away, as shown in Fig. 19, to form a stop shoulder 171 having a side face 172 and a bottom face 173 to receive in its locked position adjacent the face 170 the flange 161a, as shown in Fig. 18. As shown in Fig. 19, the brake is in the unlocked position and the hook 160 of the hook member 159 is in contact with the side face 172 and the bottom face 173 of the dog 166. When in this position, the hook member 163 is also in contact with a pull shoulder 174, as shown in Fig. 19. The expanding dog 166, which is mounted on the instrument supporting standard 9, is provided with a handle 175. The object of constructing the brake segments and the expanding dog member in the manner set forth is to insure that the expanding brake member is effectively locked when it expands against the brake sleeve. When the handle 175 is brought back, the dog 166 comes up against the hook members 160 and 163, pulling the brake segments 156 and 157 and their respective shoulders 158 and 161 away from the brake sleeve. This construction insures a positively free brake without the utilization of any springs. The gear ring 152 is provided with teeth 152a, and cooperates with a pinion 152b which is mounted on a shaft 152c, provided with a knurled handle 152d. The shaft 152c carries a staple key 152e, sliding in the keyway 152f.

The instrument carrying head 14 is provided with a vertically extending arm 176, having a rib 176a provided with a cam pin aperture 178, adapted to receive a cam pin 179, as shown in Figs. 3, 4, and in detail in Figs. 44 to 48 inclusive. The cam pin 179 is attached to a link chain 180 which is fastened to the rib 176a The cam pin 179 is tapered to provide a small end 179a and a large end 179b. In the large end 179b there is a slot 179c, which receives a floating link 179d.

The cam pin 179 is bent in its center at the point 179e, and this central point contacts with the walls of the aperture 178.

The cam pin aperture 178 has a greater diameter than the diameter of the pin 179 at its center point 179e. The apertures 183 and 184 in the ammunition carrier walls 181 and 182 are circular in character. In effecting the locking, the cam pin 179 is inserted through the apertures 184, then through cam pin aperture 178, and then aperture 183, the pin being positioned as shown in Fig. 46. The floating link 179d is provided with a slot 179h and is held in place on the pin 179 by a pivot pin 179i. When the pin 179 is in the position shown in Fig. 46, the floating link 179d is then used as a lever to rotate the pin 179 one-half revolution, bringing the concave face of the pin in contact with the rear of the cam pin aperture 178, as shown in Fig. 47.

The ammunition carrier 177 has side walls 181 and 182, and these are provided with apertures 183 and 184, the aperture 183 being adapted to receive the small end of a cam pin 179, and the aperture 184 being adapted to receive the large end of the same. The tightening point 179e of the cam pin 179 contacts with the upper portion of the cam pin aperture 178 when the pin is in its locked position. The cam pin 179 is provided at its small end with an aperture 179f to receive a cotter pin 179g.

The side walls 181 and 182 are cut away to form shoulders 181a and 182a, as shown in Figs. 3, 4 and 45. The walls 181 and 182 are also connected by a cross rod 181b the cut out portion 176b in the standard 176. It will therefore be seen that when the pin 179 is rotated to its locking position, the ammunition carrier 177 will be drawn tightly against the standard 176 at points opposite the shoulder 181a, 182a, and the rod 176b.

The arrangement above described enables the ammunition box to be quickly detached from the carrying head standard, so that the instrument locking device may be dismantled.

The ammunition carrier 177 is provided with vertical and horizontal spirit levels 185 and 186.

The cradle base or seat 15 is provided with cradle sides 187 and 188, and a central aperture 189 for ejecting shells, as shown in Figs. 11 to 16 inclusive. Clamping members 189' and 190 are also provided. The clamping member 190 is apertured to receive the pins 191 and 192 of the cross or transverse members 193 and 194. The clamping member 189' is apertured to receive the pins 195 and 196 of the cross members 197 and 198.

The cradle seat sides 187 and 188 are provided with recesses 199, shown best in Fig. 16, the free ends of the cross or transverse members 193, 194, 197 and 198 being slidably mounted thereon. It is to be noted that the arrangement of the cross members of the cradle sides is such that each cradle member carries two of the cross members, and that the cross members of one side are positioned beside the cross members of the other side.

When the locking device is used to lock an instrument such as a machine gun having a high recoil, pins 200, 201, 202 and 203 are provided on the side members 189' and 190 respectively, as shown in Fig. 12, which shows the locking device in its unlocked position.

The cross members 193, 194, 197 and 198 are provided with cam pins 204, 205, 206 and 207 respectively, projecting downwardly from their under sides.

Cooperating with the cross arms 193, 194, 197 and 198 is a sliding locking plate 208, this plate also functioning to open and close the locking device. The plate 208 rides on pads 209 and 210, as shown in Fig. 13. In the upper face of the plate 208, at the rear end 211, there is provided a pair of diagonal cam slots 212, receiving the pins 204 and 206, and those ends of these slots which are furthest apart are provided with parallel portions 213 forming cam dwells. Similarly at the other end of the sliding member 208 there are provided diverging cam slots 214, receiving pins 205 and 207, and terminating in parallel dwell portions 215, the diagonal portions of the cam slots at one end of the plate corresponding to the slot portions at the other end. It will be noted however that the dwell or parallel portions at each end are so arranged that one of these dwell portions has its junction with its diagonal slot offset longitudinally of the plate with respect to the other dwell portion. The reason for this will be understood when the function and operation of the plate 208 are considered. This plate forms a cam member and its function is to move the cradle sides toward and from each other, and thus toward the cradle base or bottom. Moreover, the action of the plate is to maintain the cradle sides symmetrically positioned with respect to the center line $x$—$x$ of the cradle base. Finally, it is the function of the dwell portions of the slots to lock the cradle sides in clamping position. In operation it is to be noted that the camming pins 204, 205, 206 and 207 being carried on the respective cross members, are necessarily arranged in pairs with one pin of each pair offset longitudinally of the cradle with respect to the other. In order to effect the camming action to draw the cradle sides towards each other, the plate in the present arrangement is moved longitudinally to spread the pins apart. This movement of the cradle sides towards each other continues until the plate 208 has moved to bring the dwell portions to such positions as receive the pins. If the pins are to cease their lateral movement simultaneously so that the cradle sides come to rest equally spaced from the center line $x$—$x$, then they must be caused to engage the dwells simultaneously. Accordingly, since the pins are offset, as above described, the dwells must also be equally offset. Obviously, the arrangement of the pins, slots and dwells may be reversed so that the dwells are at the closure ends of the slots and the pins are moved towards each other to draw the cradle sides towards each other.

In order to operate the cam plate 208, there is provided an operating lever 216, having a handle 217 at one end, and pivoted to the cradle bottom on a bolt or pin 218. The lever 216 is slotted at 219 to receive a pin 220 on the underneath side of the plate 208, as shown in Fig. 13. When the handle 217 is operated by virtue of the pin connection described, the plate 208 is pulled backwards and forwards to open and close the locking device. The arrangement of the lever 216 is such that upon pulling the handle away from the cradle, as shown in Fig. 12, the cam pins are engaged in the closure portions of the cam slots and the cradle sides are forced apart to release the gun. When the motion of the handle 217 is reversed, the cam pins move in the diagonal cam slots in a diverging direction towards the dwell portions, and the cradle sides are brought to a clamping position with respect to the instrument carried by the cradle, as shown in Fig. 11. The continued movement of the handle 217 causes the cam pins to engage the dwell portions adjacent the cam slots to effectively lock the instrument on the cradle base. In other words, the arrangement of the pins and slots provides a compound movement functioning first to clamp the instrument, such as a gun, on and to the instrument seat or cradle, and then to lock it thereto, in such a manner as to minimize the unlocking tendency induced by the recoil of the gun.

When one of a cooperating set of parts is made of aluminum, the other may, if made of aluminum, wear to an unusual degree, and therefore to prevent the same, the part that would take the wear is covered with a wear-resisting material, for example, a sheet of steel. For example, as shown in Fig. 16, the lever 216 is made of steel and the cradle bottom on which it normally would slide is made of aluminum. In order to prevent any undue wear, a steel plate 221 is inserted. A cover plate 222 having a handle 223 is provided to cover the slide plate, and its cooperating part. The cover plate 222 is also provided with a stop pin 224 and the back end 225 of the cover plate 222 is inserted in a slot 226 on the vertically extending wall 227 of the cradle base.

When the cover plate 222 is in position, as shown in Figs. 11 and 13, the locking mechanism cannot be disassembled. In order to disassemble, the handle 223 and the cover plate is turned to its open position, and the handle 217 of the lock is pulled outwardly to the open position, as shown in Fig. 12. In this position, the pin 224 is in such a free position as to allow the cover 223 to be pulled upwardly and forwardly, or to the right of its position shown in Fig. 13.

In order to further disassemble the locking device, the handle 217 is pulled all the way back, as shown in Fig. 15, thereby clearing the cross members and allowing the cradle sides to be withdrawn.

In order to make doubly sure that the locking device is locked, an outside lock is used. Such an outside locking device is shown in Figs. 1 and 2, and in detail in Figs. 8, 9, 10, 10A, 10B and 10C. On the rotatable handle 217, there is provided a sleeve 228 having a stop pin 229, which rides in a slot 230. Integral with the sleeve 228 is a hook pin 231, as shown best in Figs. 10B and 10C, the pin projecting downwardly from the lever or hook bar 231a. The hook pin 231 forms a male member cooperating with a cupped female part 232, which is slightly beveled at 232a to facilitate riding up engagement of the hook pin 231 when the lever 216 moves in the form of an arc, indicated by the arrows in Fig. 8, to perform its locking function. The riding up engagement is shown in detail in Fig. 10. A female cup 232 is formed in the bracket 233, which is fastened to the side wall and bottom wall of the instrument seat 15 by means of a screw 234. A spring 235 is fixed to the locking lever 216. This spring may be fixed to the upper side of the lever at 235a, as shown in Figs. 8, 9 and 10a, or to the lower side at 235b, as shown in Figs. 10b and 10c. The latter is the preferred structure. As shown in Figs. 10b and 10c, the spring 235 projects in and through a slot 231c in hook lever bar 231a. The hook pin 231 is beveled at 231b, and engages the correspondingly beveled surface 232b of the cupped member 232. When the hook pin 231 is in engagement with the beveled surface 232b of the cup 232, the instrument carried by the cradle cannot be released accidentally. To release, the handle 217 is given a rotative upward motion, disengaging member 231 from the beveled surface 232b of the cupped member 232. Continued movement forward of the handle releases the clamping members.

The locking lever 216 and the hook bar 231a are shaped and positioned so that the assemblage of locking elements may be positioned to allow removal of the clamping members, the cam plate, and its related members. The position the locking lever 216 takes to allow for removal of the above members is shown in Fig. 15. As shown in Fig. 10b, the locking lever 216, the handle 217, the hook bar 231a and the spring 235 are inclined to facilitate disassembling operation.

The advantage of a lock constructed as set forth is that when the handle 217 is given a closing motion, nothing has to be done but close it, as the hook pin 231 rides up on the female section 232, and in that manner gives a cam effect to ride up and drop in the female portion of the cup. Figure 10 shows how the camming action and consequent locking is effected.

The ball member 5 is provided with a vernier ring 236, as shown in Figures 2, 4 and 7. The vernier ring has a depending flange 237 which is apertured to receive a retaining screw 238 provided with a projecting nose 239, which engages a similarly formed groove 240 in the ball member 5. This construction insures that the vernier ring will be retained in place on the ball member, even when the latter is subjected to high vibratory impact. The vernier ring 236 is free to rotate on the ball member 5, but is locked in place after once being set by the screw 241. A finger 242, mounted on standard 10, as shown in Fig. 4, cooperates with the vernier ring and enables the instrument or gun to be set at any given or horizontal angle.

The upper surface of the vernier 236 carries two sets of numerals. It is numbered from the zero point 236a to the right and left for half of the circumferential distance, the surface carrying the numbers 1 to 32 from the point 236a in both directions to the point 236b. By this arrangement, the vernier may be easily read regardless of whether the vernier is turned in a clockwise or anti-clockwise direction. The numerals are staggered and differentially sized, the small size numerals appearing at 236c, and the large size numerals at 236d.

The vernier 236 is preferably laid off in divisions designated as "artillery mils". Starting from the zero point 236a, the first large subdivision to the numeral 1 in either direction covers 100 mils.

Mounted on the supporting standard 9 is a vertically disposed vernier 243 cooperating with a finger or indicator 244 to enable the instrument carried by the tripod to be adjusted to a given vertical angle.

The face of the vertically disposed vernier 243 is arranged similarly to the face of the vernier 236. Starting with the zero point, the numbers are arranged consecutively from either direction for half of the circumferential difference. The numbers are differentially sized, the small numbers being indicated by the numeral 243c, and the large numbers by the numeral 243d. The vernier face is marked with infantry mils instead of artillery mills, as is the case in vernier 236. As shown in Fig. 26, starting from the point 243b, which is directly above the numerals 10, the face has marks every 5 mils. In other words, between the numbers 10 and 11, the surface is marked to indicate 100 mils.

When the tripod is used for supporting an instrument having a recoil, such as a machine gun, the mode of operation is as follows: The mode of operation will be described in connection with the use of a machine gun having an explosion blow equivalent to 90 pounds. The wedge springs 144 are designed to take care of a compression pressure corresponding to the explosion pressure and the compression pressure induced by the weight of the gun acting through the carrying head lever distance. Therefore, the springs 144 are predeterminedly set so as to counterbalance the compression pressure induced by the explosion pressure and the weight of the gun. Compression of the springs 144 may be regulated by means of the guide nut 138 and may, of course, be greater than that specified. When the axle head or hand nut 117 is turned, the carrying head 14 is brought into tight engagement by means of the packing 153 with the supporting standard 9, the supporting axle 13 moving to thereby bring the spring 121 under pressure.

The carrying head 14 is pivoted on the axle 13 and is moved about its pivot when a target such as an aeroplane is being followed prior to the firing of the gun. The carrying head 14 is provided with a lower wedge member 135. As the carrying head moves in either direction, clockwise or anticlockwise, its smooth motion is maintained as the wedge member 135 is always under the tension exerted by the cam pin 141 and the spring 144, the cam pin being retracted as the wedge member moves in either direction, clockwise or anti-clockwise, putting the springs under compression. As the carrying head 14 moves off center, the gun is moved off center, its entire weight acting as a lever and exerting a constantly increasing torque which is taken up in an exceedingly smooth manner by the wedge 135 and the cooperating springs 144. As the carrying head 14 and the wedge member 135 move off center, the cam pin 141 is retracted, compressing the springs 144, and due to the wedge member, the weight of the gun is automatically taken care of, and this would not be the case if the compression springs 144 were employed with a carrying head which did not have a wedge member or its equivalent.

The herein disclosed instrument carrying head having a wedge-shaped member and its cooperating parts including the pressure means are claimed in co-pending application Serial No. 497,289, filed November 21, 1930.

The herein disclosed locking arrangement for locking an instrument member, such as a machine gun to its cradle, is basically claimed in Patent No. 1,919,223, granted July 25, 1933.

What I claim is:

1. In a mount having a leg member, the combination of a leg support, a leg pivotally mounted in said leg support and means for positively maintaining the former locked in the latter against horizontal and vertical motion components induced by a vibratory impact, said means including a cam-member eccentrically mounted adjacent the leg support and provided with a composite curved and straight line cam-face.

2. In a mount having a leg member, the combination of arcuate members forming a locking ring, a ball member mounted therein, a leg pivotally mounted in said arcuate members, means for locking the latter together and on the ball member, and means for positively maintaining the leg member locked in said arcuate members against the unlocking action induced by a high vibratory impact.

3. In a mount having a leg member, the combination of a leg support, a shaft mounted thereon and carrying a movable pressure-bearing, a leg pivotally mounted on said shaft, a cam member eccentrically mounted on the shaft and provided with a composite straight line and curved cam face adapted to abut the exterior face of the pressure bearing when the cam member is in its locked position and thereby enable the leg to resist the unlocking action including the horizontal motion component induced by a high vibratory impact, and separate means for enabling the leg to resist the rotative motion induced by high vibratory impact and tending to vibrate the leg; said means including cooperating meshing members fixed respectively on the leg head and on the leg support.

4. In a mount having a leg member, the combination of an arcuate locking ring, a ball member mounted therein, a leg member pivotally mounted on said arcuate locking ring, means for positively maintaining the leg member locked therein against the unlocking action induced by vibratory impact, and means for effecting the quick release of the leg member on unlocking.

5. In a mount having a leg member, the combination of arcuate locking members having upper and lower strengthening flanges, means for locking the arcuate members together, a leg member pivotally mounted between said flanges, means for positively maintaining the leg member locked in said arcuate members against the unlocking action induced by high vibratory impact, and means for effecting a quick release of the leg member on unlocking.

6. In a mount having a leg member, the combination of arcuate locking members having upper and lower strengthening flanges, a ball member mounted in said arcuate members, means for locking the arcuate members together on the ball member, a leg member pivotally mounted between said flanges, said leg member comprising a leg having a plurality of sides, a cuff having a cuff hub rigidly fixed on the leg sides at the head end, and a spacing block between said sides and in tight engagement therewith, means for maintaining the leg member locked in said arcuate members against the unlocking action induced by a high vibratory impact, and auxiliary means enabling the leg member to resist the rotative motion induced by high vibratory impact and tending to vibrate the leg.

7. In a mount having a leg member, a formed metal leg provided with a plurality of sides and having a tendency to vibrate under forces induced by a high vibratory impact and communicate the same to the mounting and the instrument carried thereby, a cuff exteriorly fixed on the leg sides adjacent the upper end thereof and a spacing block positioned between said sides and in tight engagement therewith, said cuff and spacing block conferring rigidity upon the leg member and resisting the transmission of vibratory forces to the leg and the mounting.

8. In a mount having a leg member, a formed metal leg having a tendency to vibrate under forces induced by a high vibratory impact, and communicate the same to the mounting, said leg having a loading element adjacent its upper end to provide additional mass, increase the rigidity of the leg and resist the transmission of vibratory forces to the leg and the mounting.

9. In a mount having a leg member, a leg support, a stationary leg pivotally mounted in the leg support, an extensible leg slidably mounted within said stationary leg, and loading elements in said leg to increase the rigidity thereof and resist the transmission of vibratory impact to the mounting.

10. In a mount having a leg member, a leg support, leg bearings thereon, an apertured metal leg carrying an apertured loading element adjacent its upper end, a shaft mounted in said leg bearings and passing through the apertured leg and loading element to pivotally mount the leg on the leg support, said loading element increasing the rigidity of the leg and resisting the transmission of vibratory forces to the leg and mounting.

11. In a mount having a leg member, a leg support, leg bearings thereon, an apertured metal leg carrying an apertured loading element adjacent its upper end, a shaft mounted in said leg bearings and passing through the apertured leg and loading element to pivotally mount the leg on the leg support, means for locking the leg in the leg support to positively resist the unlocking action, and auxiliary means enabling the leg to resist the rotative motion induced by a high vibratory impact tending to vibrate the leg.

12. In a mount having a leg member, a leg support, leg bearings thereon, an apertured metal leg carrying an apertured loading element adjacent its upper end, a shaft mounted in said leg bearings and passing through the apertured leg and loading element to pivotally mount the leg on the leg support, means for locking the leg in the leg support, auxiliary means enabling the leg to resist the rotative motion induced by a high vibratory impact tending to vibrate the leg, and means for effecting a quick release of the leg member on unlocking.

13. In a mount having a leg member, a leg support, leg bearings thereon, an apertured metal leg carrying an apertured spacing block adjacent its upper end and in tight engagement therewith, a cuff exteriorly fixed on the leg and provided with an apertured hub, a shaft mounted in said bearings, and passing through the apertured leg and hub to pivotally mount the leg on the leg support, means for locking the leg in the leg support to positively resist unlocking action, and auxiliary means enabling the leg to resist the rotative motion induced by a high vibratory impact tending to vibrate the leg.

14. In a mount having a leg member, a leg support, leg bearings thereon, an apertured metal leg carrying an apertured spacing block adjacent its upper end and in tight engagement therewith, a cuff exteriorly fixed on the leg and provided with an apertured hub, the latter merging into the sides of the cuff, a shaft mounted in said bearings and passing through the apertured leg and hub to pivotally mount the leg on the leg support, means for locking the leg in the leg support, a locking collar having a biting edge fixed on the cuff-hub adapted to cause the locking collar to bite and lock itself into the hub cuff when acting under a circular motion tending to disengage the collar from the cuff, and a cooperating locking collar fixed on the leg support, both locking members carrying intermeshing elements.

15. In a mount having a leg member, a leg support, leg bearings thereon, an apertured metal leg carrying an apertured spacing block adjacent its upper end and in tight engagement therewith, a cuff exteriorly fixed on the leg and provided with an apertured hub, the latter merging into the sides of the cuff, a shaft mounted in said bearings and passing through the apertured leg and hub to pivotally mount the leg on the leg support, means for locking the leg in the leg support, a locking collar having a biting edge fixed on the cuff-hub and adapted to cause the locking collar to bite and lock itself into the hub cuff when acting under a circular motion tending to disengage the collar from the cuff, a cooperating locking collar fixed on the leg support, both locking members carrying intermeshing elements, and means for effecting a quick release of said intermeshing elements on unlocking.

16. In a mount having a leg member, a leg support, leg bearings thereon, an apertured metal leg carrying an apertured spacing block adjacent its upper end and in tight engagement therewith, a cuff exteriorly fixed on the leg and provided with an apertured hub, the latter merging into the sides of the cuff, a shaft mounted in said bearings and passing through the apertured leg and hub to pivotally mount the leg on the leg support, means for locking the leg in the leg support, a locking collar having a biting edge fixed on the cuff-hub and adapted to cause the locking collar to bite and lock itself into the hub cuff when acting under a circular motion tending to disengage the collar from the cuff, a cooperating locking collar fixed on the leg support, intermeshing teeth on the locking collars, recesses therein, and a compression spring mounted in said recesses for effecting a quick release of the leg member on unlocking.

17. In a mount having a leg member, the combination therewith of a leg support, bearings thereon, an apertured metal non-extensible leg carrying an apertured loading element adjacent its upper end, a shaft mounted in said leg bearing and passing through the apertured leg and loading element to pivotally mount the leg on the leg support, said loading element increasing the rigidity of the leg and resisting the transmission of vibratory forces to the leg and mounting, an extensible leg slidably mounted within the non-extensible leg, a loading element within the extensible leg, means for locking the legs together, and means for taking up the wear between the legs.

18. In a mount having a leg member, a leg mounting comprising a leg support, leg bearings thereon, a movable pressure block in one of said bearings, an apertured leg member, a wearing plate between the pressure block and the leg member, and a shaft mounted in said leg bearings and pressure block and pivotally carrying the leg member, one end of said shaft being adjustable to take care of wear between the elements of the leg mounting.

19. In a mount having a leg member, a leg support, a non-extensible leg comprising an aluminum alloy mounted in the leg support, an extensible leg comprising an aluminum alloy slidably mounted in said non-extensible leg, and loading elements in said legs to increase the rigidity thereof and resist the transmission of vibratory impact to the mounting.

20. In a mount having a leg member, the combination of a locking member, a leg pivotally mounted on said locking member, means for positively maintaining the leg locked in said locking member against the unlocking action induced by vibratory impact, and means for effecting the quick release of the leg on unlocking.

21. In a mount, the combination of a ball member made of a soft alloy, and a locking ring made of a soft alloy in contact with the outer surface of the ball member, whereby an effective locking action is obtained under high impact.

22. In a mount, the combination of a ball member of a soft aluminum alloy, and a locking ring of an aluminum alloy in contact with the outer surface of the ball member whereby an effective locking action is otained under high impact.

23. In a support, a ball member provided with a bottom wall, a suporting head having a base mounted on said bottom wall, a friction plate carried by the latter, and a brake member positioned adjacent the base of the supporting head for insuring positive braking action between the latter and the bottom wall of the ball member.

24. In a mount, an instrument carrying head mounted on a floating axle to swing from an upper to a lower position, a tension spring mounted on the axle and bearing against the outer wall of the instrument carrying head, means for putting the spring under tension, and braking means for keeping the axle member and the carrying head under a predetermined set tension.

GREENHOW JOHNSTON.